(12) United States Patent
Moyer et al.

(10) Patent No.: US 7,474,297 B2
(45) Date of Patent: Jan. 6, 2009

(54) CONTAMINANT-RESISTANT OPTICAL MOUSE AND CRADLE

(75) Inventors: Vincent C. Moyer, Milpitas, CA (US); Mark M. Butterworth, Santa Clara, CA (US); Michael J. Brosnan, Fremont, CA (US); Roopinder Singh Grewal, San Jose, CA (US); Paul Michael Welch, Cupertino, CA (US); Marshall T. Depue, San Jose, CA (US); Tong Xie, Santa Clara, CA (US)

(73) Assignee: Avago Technologies ECBU IP (Singapore) Pte., Singapore (SG)

( * ) Notice: Subject to any disclaimer, the term of this patent is extended or adjusted under 35 U.S.C. 154(b) by 709 days.

(21) Appl. No.: 10/806,367

(22) Filed: Mar. 22, 2004

(65) Prior Publication Data

US 2005/0206617 A1    Sep. 22, 2005

(51) Int. Cl.
*G09G 5/08*    (2006.01)

(52) U.S. Cl. ..................... 345/163; 345/156
(58) Field of Classification Search ............... 345/157, 345/163
See application file for complete search history.

(56) References Cited

U.S. PATENT DOCUMENTS

| | | | |
|---|---|---|---|
| 4,409,479 A | 10/1983 | Sprague et al. | |
| 4,794,384 A * | 12/1988 | Jackson | 345/166 |
| 4,920,260 A | 4/1990 | Victor et al. | |
| 5,248,873 A | 9/1993 | Allen et al. | |
| 5,578,813 A | 11/1996 | Allen et al. | |
| 5,578,817 A | 11/1996 | Bidiville et al. | |
| 5,644,139 A | 7/1997 | Allen et al. | |
| 5,703,356 A | 12/1997 | Bidiville et al. | |
| 5,786,804 A | 7/1998 | Gordon | |

(Continued)

FOREIGN PATENT DOCUMENTS

DE    20019915 U1    5/2001

(Continued)

OTHER PUBLICATIONS

Svelto, Orazio, "Principles of Lasers", pp. 9-10, ©1998, 1989, 1982, 1976.

(Continued)

*Primary Examiner*—Bipin Shalwala
*Assistant Examiner*—Afroza Y Chowdhury

(57) ABSTRACT

A contaminant-neutralizing cradle comprises a base and a support surface configured to removably receive a coherently-illuminated mouse. A neutralizing element is disposed on the support surface for alignment with at least one exposed surface of an optics module of the mouse and is configured to neutralize the optical effect of a contaminant on the at least one exposed surface. A method of neutralizing contaminants for an optical mouse comprises providing a mouse containing an optics module having at least one surface exposed to an opening of the mouse and interposing a barrier in the mouse between a contaminant and the at least one exposed surface. A method of detecting contaminants comprises aligning an optics module of a mouse with an imaging surface, obtaining a first image of the imaging surface, via application of coherent illumination from the optics module to the imaging surface, analyzing the first image to identify an interference pattern associated with a contaminant, alerting a user if a parameter of the interference pattern exceeds a threshold value.

5 Claims, 7 Drawing Sheets

U.S. PATENT DOCUMENTS

| | | | |
|---|---|---|---|
| 5,854,482 | A | 12/1998 | Bidiville et al. |
| 5,965,879 | A | 10/1999 | Leviton |
| 6,084,574 | A | 7/2000 | Bidiville |
| 6,093,923 | A | 7/2000 | Vock et al. |
| 6,124,587 | A | 9/2000 | Bidiville et al. |
| 6,218,659 | B1 | 4/2001 | Bidiville et al. |
| 6,256,016 | B1 | 7/2001 | Piot et al. |
| 6,281,882 | B1 | 8/2001 | Gordon et al. |
| 6,320,173 | B1 | 11/2001 | Vock et al. |
| 6,509,889 | B2 | 1/2003 | Kamper et al. |
| 6,529,622 | B1 | 3/2003 | Pourjavid |
| 6,603,111 | B2 | 8/2003 | Dietz et al. |
| 6,657,184 | B2 * | 12/2003 | Anderson et al. ............ 250/221 |
| 6,770,863 | B2 | 8/2004 | Walley |
| 6,823,077 | B2 | 11/2004 | Dietz et al. |
| 7,071,922 | B2 * | 7/2006 | Sun et al. .................... 345/166 |
| 7,127,737 | B1 | 10/2006 | Bayrakeri et al. |
| 7,176,432 | B2 | 2/2007 | Komiya |
| 2002/0101587 | A1 | 8/2002 | Wilson et al. |
| 2002/0180880 | A1 * | 12/2002 | Bean et al. .................. 348/335 |
| 2003/0001078 | A1 | 1/2003 | Baharav et al. |
| 2003/0103037 | A1 | 6/2003 | Rotzoll |
| 2003/0146975 | A1 | 8/2003 | Joung et al. |
| 2004/0051798 | A1 | 3/2004 | Kakarala et al. |
| 2004/0246232 | A1 * | 12/2004 | Chang et al. ................ 345/163 |
| 2005/0024336 | A1 * | 2/2005 | Xie et al. .................... 345/166 |
| 2005/0083303 | A1 * | 4/2005 | Schroeder et al. ........... 345/166 |
| 2005/0195163 | A1 | 9/2005 | Grewal et al. |
| 2005/0206614 | A1 | 9/2005 | Brosnan et al. |
| 2005/0283307 | A1 | 12/2005 | Siah et al. |
| 2006/0044267 | A1 | 3/2006 | Xie et al. |

FOREIGN PATENT DOCUMENTS

| | | |
|---|---|---|
| DE | 10226950 A1 | 4/2003 |
| JP | 05115040 | 5/1993 |
| WO | WO-00/38103 | 6/2000 |

OTHER PUBLICATIONS

Kakarala, Ramakrishna et al., Patent Application entitled "Method for Detecting and Correcting Defective Pixels in a Digital Image Sensor", pp. 1-57, (Sep. 18, 2002).

Bruce D. Lucas et al., article entitled "An Iterative Registration Technique with an application to Stero Vision", pp. 674-679, Aug. 24-28, 1981.

German Office Action dated Mar. 19, 2007 for the counterpart German Patent Application No. 102005001167.5-53.

English Translation of German Office Action dated Mar. 19, 2007 for the counterpart German Patent Application No. 102005001167.5-53.

Downs, J et al., "An Improved Video-Based Computer Tracking System for Soft Biomaterials Testing", *Biomedical Ingineering, IEEE Transaction on*, vol. 37, Issue 9, Digital Object Identifier 10.1109/10.58600, (1990),903-907.

Williamson, I.C. et al., "Source Width Insensitive Optical Position Sensor", *Instrumentation and Measurement, IEEE Transactions on* vol. 43, Issue 6, (Dec. 1994), 848-856.

Tartagni, M et al., "A Photodiode Cell for Applications to Position and Motion Estimation Sensors", *Industrial Electronics, IEEE Transactions on*, vol. 43, Issue 1, Digital Object Identifier 10.1109/41.4481426., (Feb. 1996),200-206.

Miller, M.I. et al., "Automatic Target Recongnition Organized Via Jump-Diffusions Algorithms", *Image Processing, IEEE Transactions on*, vol. 6, Issue 1, Digital Object Identifier 10.1109/83.552104, vol. 6, Issue 1, Digital Object Identifier 10.1109/83.552104, vol. 6, Issue 1,(1997),157-174.

Scheffer, D. et al., "Random Addressable 2048x2048 Active Pixel Image Sensor", *Electron Devices, IEEE Transactions on*, vol. 44, Issue 10, Digital Object Identifier 10.1109/16.628827., (1997),1716-1720.

Clapp, M.A. et al., "A Dual Pixel Type Array for Imaging and Motion Centroid Localization", *Sensor Journal, IEEE*, vol. 2, Issue 6, Digital Object Identifier 10.1109/JSEN.2002.806894., (Dec. 2002),529-548.

Weisenberger, A.G. et al., "A Restraint Free Small Animal SPECT Imaging System with Motion Tracking", *Nuclear Science*, IEEE Transactions on vol. 52, Issue 3, Part 1, vol. 52, Issue 3 Part 1,(Jun. 2005),638-644.

Burns, R.D. "Object Location and Centroiding Techniques with CMOS Active Pixel Sensors", *Electron Devices, IEEE Transactions on*, vol. 50 Issue 12, Digital Object Identifier 10.1109/TED.2003.819260., (Dec. 2003),2369-2377.

Higgins, C.M. et al., "A Biologically Inspired Modular VLSI System for Visual Measurement of Self-Motion", *Sensor Journal, IEEE*, vol. 2 Issue 6, Digital Object Identifier 10.1109/JSEN.2002./807304., (Dec. 2002),508-528.

Honghao, Ji et al., "CMOS Contact Imager for Monitoring Cultured Cell", *Circuits and Systems, 2005. ISCAS 2005. IEEE International Symposium*, vol. 4, Digital Object Identifier 10.1109/ISCAS.2005.1465381., (May 23-26, 2005),3491-3494.

Chen, Yang "Highway Overhead Structure Detection Using Video Image Sequences", *Intelligent Transportation Systems*, IEEE Transactions on vol. 4, Issue 2, Digital Object Identifier 10.1109/TITS.2003.821209., (Jun. 2003),67-77.

Svelto, Orazio "Properties of Laser Beams", 1998, 1989, 1982, 1976.

Yoshida, A. "Optical Computing Techniques for Image/Video Compression", *Proceedings of the IEEE vol. 82, Issue 6, Digital Object Identifier 10.1109/5.286198.*, (Jun. 1994),948-954.

Berra, P. B. "Optics and Supercomputing", *Proceedings of the IEEE vol. 77, Issue 12, Digital Object Identifier 10.1109/5.48824*, (Dec. 1989),1797-1815.

Nirmaier, T et al., "High Speed CMOS Wavefront Sensor with Resistive Ring Networks of Winner Take All Circuits", *Solid state Circuits*, IEEE Journal of vol. 40, Issue 11, Digital Object Identifier 10.1109/JSSC.2005.857350., (Nov. 2005),2315-2322.

Chu, P.L. et al., "Optimal Projection for Multidimensional Signal Detection", *Acoustics, Speech, and Signal Processing (see also IEEE Transaction on Signal Processing), IEEE Transactions on*, vol. 36, Issue 5, Digital Object Identifier 10.1109/29.1587., (May 1988),775-786.

\* cited by examiner

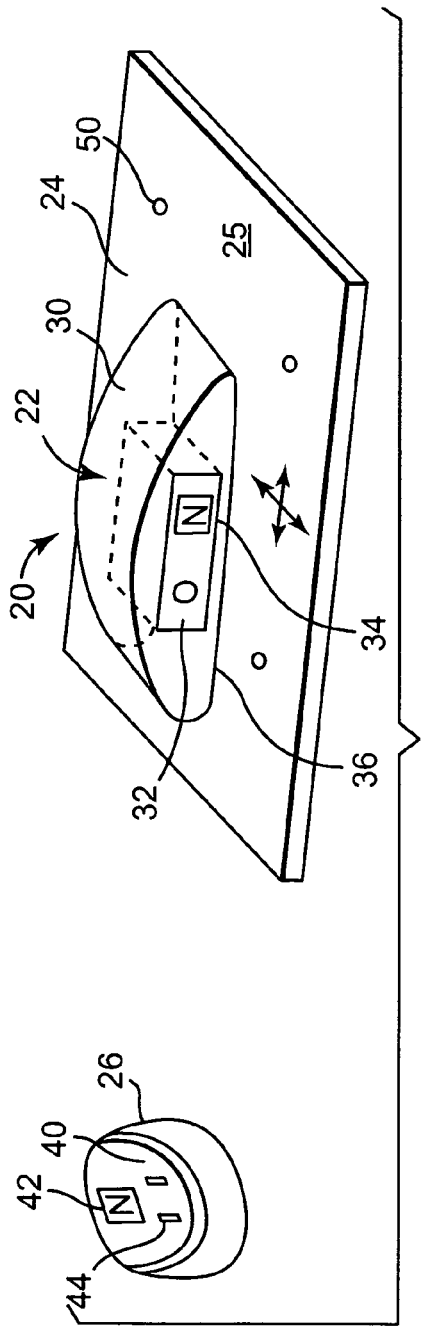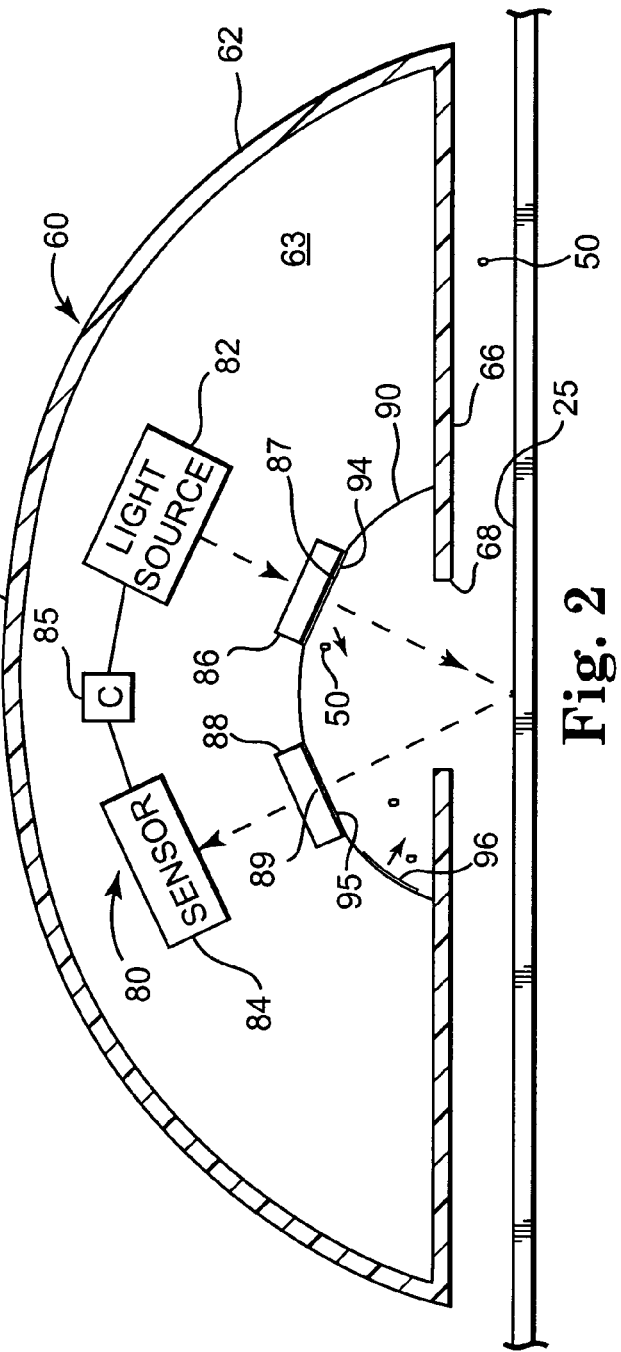

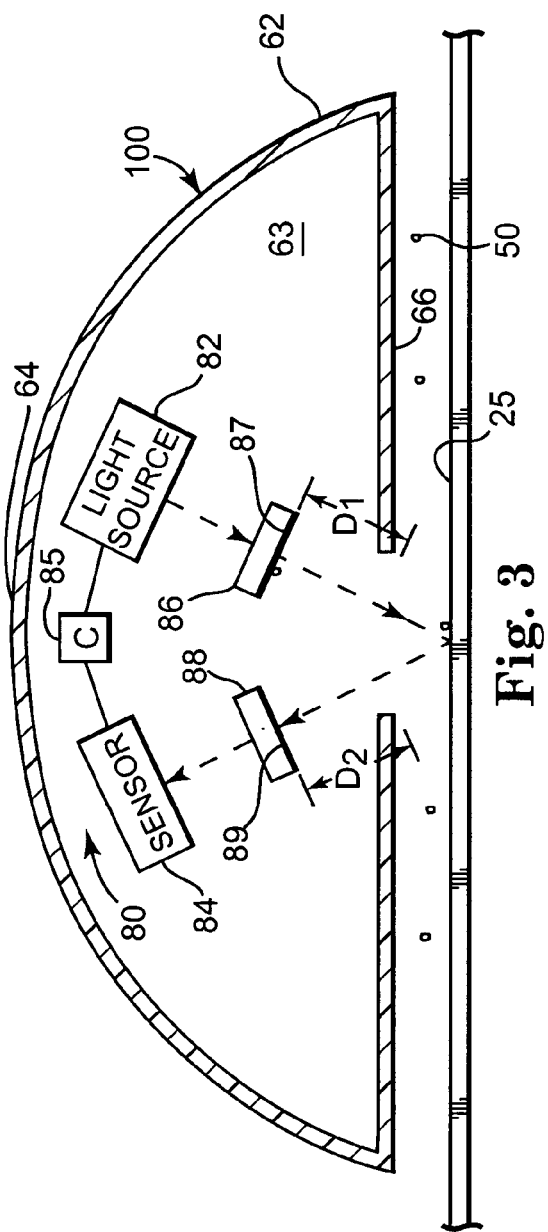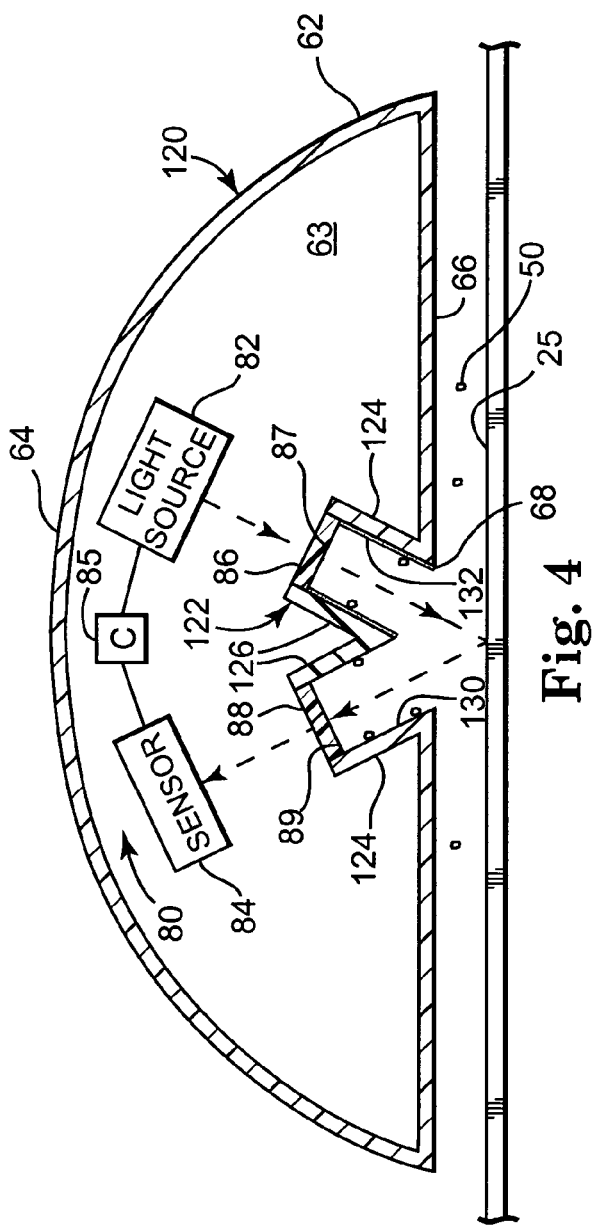

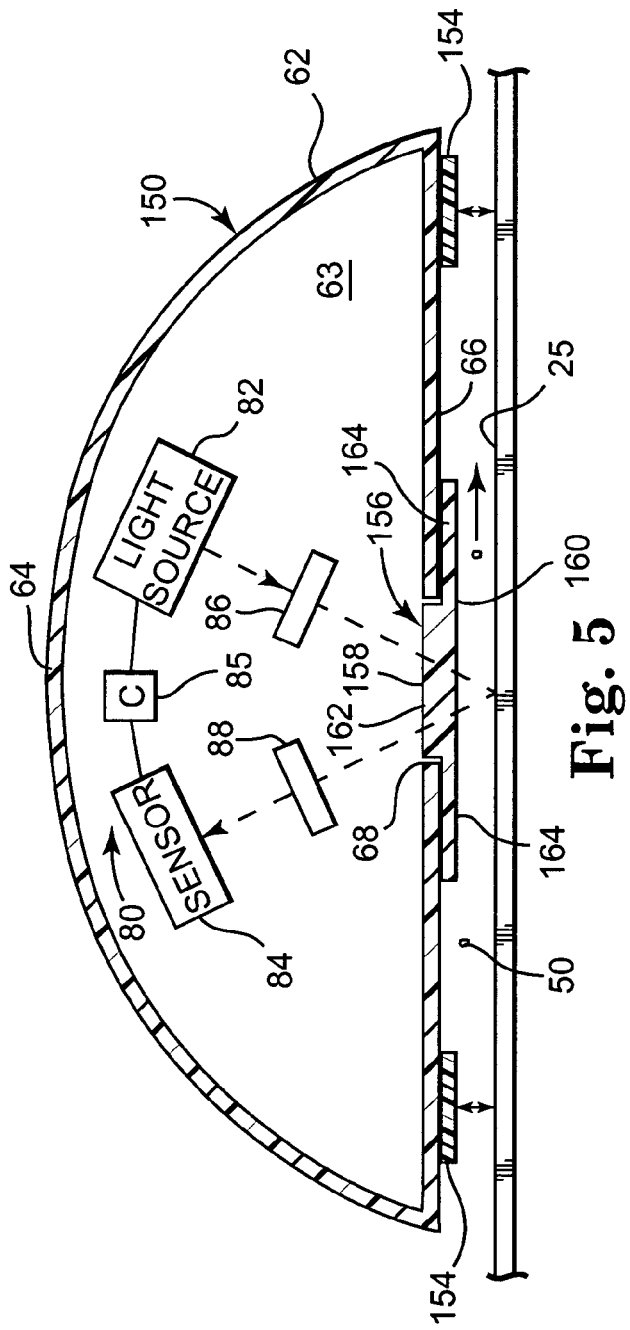

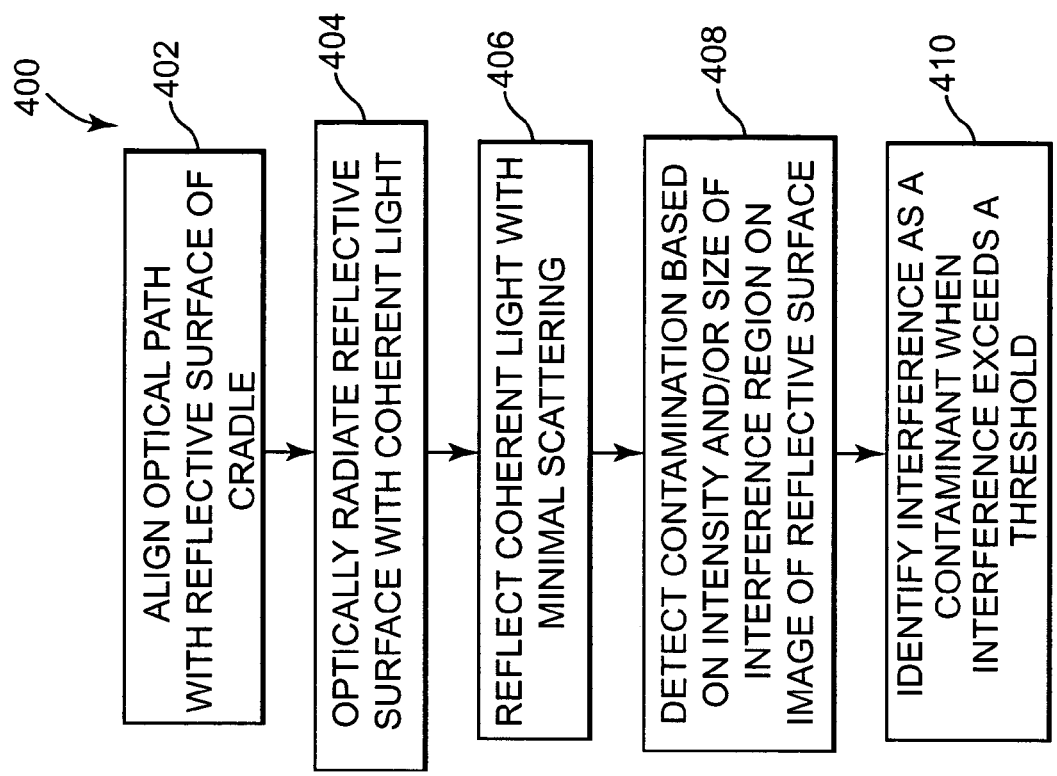
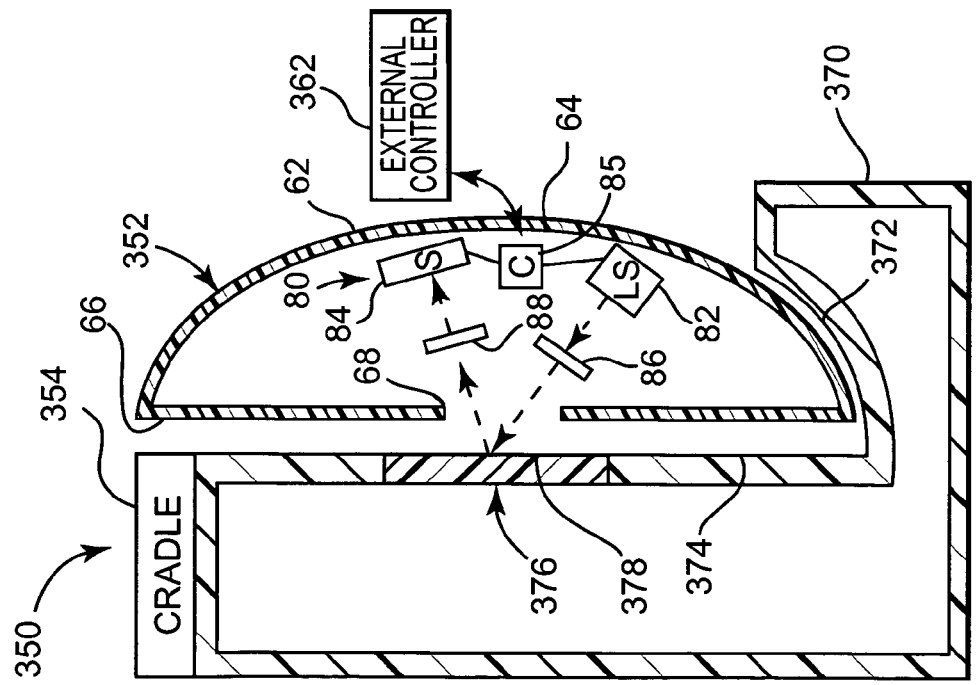

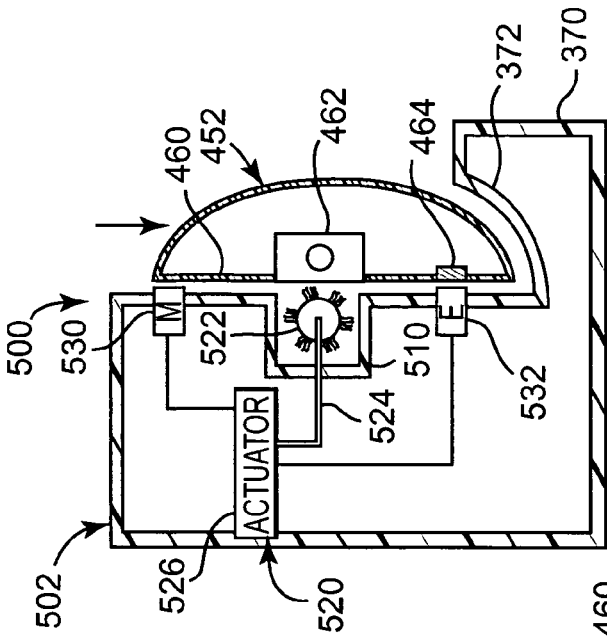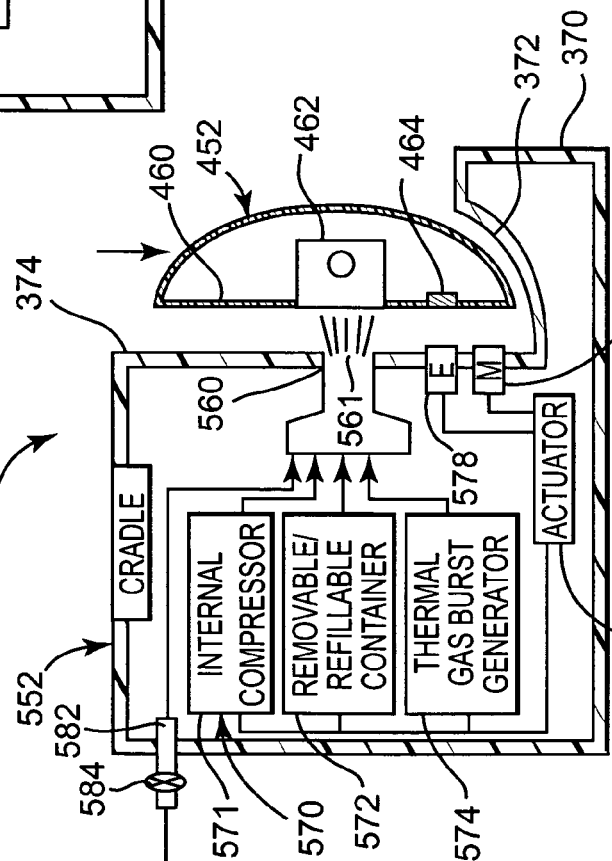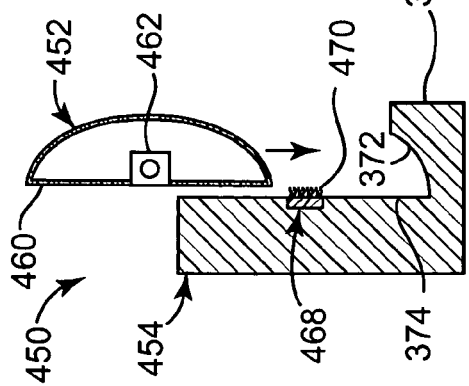

CONTAMINANT-RESISTANT OPTICAL MOUSE AND CRADLE

CROSS-REFERENCE TO RELATED APPLICATIONS

This application is related to U.S. patent application Ser. No. 10/795688, filed Mar. 8, 2004, and entitled APPARATUS FOR CONTROLLING THE POSITION OF A SCREEN POINTER THAT DETECTS DEFECTIVE PIXELS; and U.S. patent application Ser. No. 10/805814, filed on the same date as the present application, and entitled APPARATUS FOR CONTROLLING THE POSITION OF A SCREEN POINTER WITH LOW SENSITIVITY TO PARTICLE CONTAMINATION.

THE FIELD OF THE INVENTION

This invention relates generally to computer-related optical navigation devices and relates more particularly to compensating for contaminants affecting optical navigation.

BACKGROUND

Optical pointing devices, such as optical mice, direct movement information to a graphical user interface of a computer by tracking relative movement between a navigation surface, such as a mouse pad, and an image sensor within the optical pointing devices. Light is optically radiated onto the navigation surface by a light source, such as a light emitting diode or a laser. Based on the illumination of the navigation surface, images are obtained using electronic image sensors, which typically contain an array of photodetectors arranged in a pattern. Each photodetector in the array creates an output signal proportional to the intensity of light impinging on that photodetector. The output signals from the photodetector array are processed to generate an image of the navigation surface. By comparing a series of these images over time, the optical mouse develops movement information about movement of the mouse relative to the navigation surface. This movement information, upon processing, enables a corresponding movement of a pointer on the graphical user interface of the computer.

Some optical pointing devices use a coherent light source (e.g., a laser) to illuminate the navigation surface. While coherent light sources enable lower power consumption and more accurate and precise optical navigation, these coherent illumination navigation systems are more sensitive to the presence of contaminants, such as particles of dust, dirt, food, hair, and other substances. In contrast, optical pointing devices that use a non-coherent light source (e.g., a light emitting diode) are relatively unaffected by contaminants such as dirt and dust because they employ diffuse light patterns which cause the contaminants to remain out of focus in the images.

However, for coherently illuminated pointing devices, once a contaminant becomes fixed to one of the optical surfaces of the optical pointing device (e.g., an imaging lens, illumination lens, etc.) and is coherently-illuminated, it becomes a fixed pattern on the image of the navigation surface. For example, with a contaminant present, one or more photodetectors of the photodetector array of the image sensor will generate a fixed output signal having an intensity or location, that does not correspond to an actual surface feature or light pattern on the navigation surface. This fixed pattern acts as noise, distorting image comparison and thereby inhibiting accurate tracking of movement of the optical pointing device relative to the navigation surface. Unfortunately, contaminants are unavoidable during transport or use in dusty environments.

Accordingly, while coherent light sources hold the promise of improved optical navigation for optical pointing devices, there is a need to improve the contaminant resistance of coherently illuminated pointing devices.

SUMMARY

One aspect of the invention provides a contaminant-neutralizing cradle. The cradle comprises a base and a support surface, and a neutralizing element. The base and support surface are configured to removably receive a coherently-illuminated mouse. The neutralizing element is disposed on the support surface for alignment with at least one exposed surface of an optics module of the mouse and is configured to neutralize the optical effect of a contaminant on the at least one exposed surface.

Another aspect of the invention provides a method of neutralizing contaminants for an optical mouse. The method comprises providing a mouse containing an optics module having at least one surface exposed to an opening of the mouse and interposing a barrier in the mouse between a contaminant and the at least one exposed surface.

Another aspect of the invention provides a method of detecting contaminants for an optical mouse. The method comprises aligning an optics module of a mouse with an imaging surface, obtaining a first image of the imaging surface via application of coherent illumination from the optics module to the imaging surface, analyzing the first image to identify an interference pattern associated with a contaminant, and identifying the interference pattern as a contaminant if a parameter of the interference pattern exceeds a threshold value.

BRIEF DESCRIPTION OF THE DRAWINGS

FIG. 1 is a perspective view of an optical mouse, mouse pad, and cradle, according to an embodiment of the present invention.

FIG. 2 is a schematic sectional view of an optical mouse, according to an embodiment of the present invention.

FIG. 3 is a schematic sectional view of an optical mouse, according to another embodiment of the present invention.

FIG. 4 is a schematic sectional view of an optical mouse, according to another embodiment of the present invention.

FIG. 5 is a schematic sectional view of an optical mouse, according to another embodiment of the present invention.

FIG. 6 is a partial schematic sectional view of an optical mouse, according to another embodiment of the present invention.

FIG. 7 is a schematic sectional view of an optical mouse, according to another embodiment of the present invention.

FIG. 12 is a schematic sectional view of an optical mouse and a cradle, according to one embodiment of the present invention.

FIG. 13 is a flow diagram of a method of detecting contaminants with a mouse cradle, according to one embodiment of the present invention.

FIG. 14 is a schematic sectional view of an optical mouse and a cradle with a cleaning mechanism, according to one embodiment of the present invention.

FIG. 15 is a schematic sectional view of an optical mouse and a cradle with a cleaning mechanism, according to another embodiment of the present invention.

FIG. 16 is a schematic sectional view of an optical mouse and a cradle with a cleaning mechanism, according to one embodiment of the present invention.

DETAILED DESCRIPTION

Figure 8:
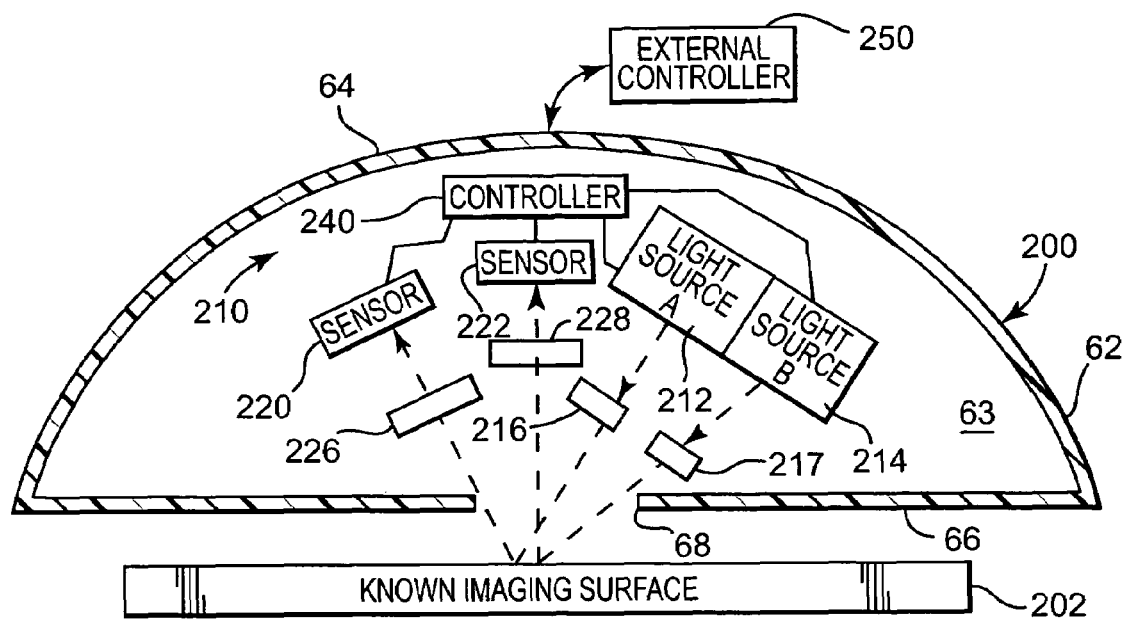
FIG. 8 is a schematic sectional view of an optical mouse and a known imaging surface, according to one embodiment of the present invention.

In the following detailed description, references made to the accompanying drawings, which form a part hereof, and which is illustrated by way of illustrations specific embodiments in which the invention may be practiced. In this regard, directional terminology, such as "front," "back," etc., is used with reference to the orientation of the figures(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention compensate for the presence of contaminants, such as particles of dust or dirt, when using a coherently-illuminated mouse. In some embodiments, one or more barrier structures are introduced into a cavity of the mouse to prevent dirt from reaching exposed optical surfaces, such as a surface of the imaging lens or illumination lens. In one embodiment, these barrier structures comprise active and/or passive mechanisms, and may extend across the optical pathway or just extend alongside the optical path. In other embodiments, these barrier structures further comprise elements that attract and capture contaminants to prevent their migration to the exposed optical surfaces, as well as elements that repel contaminants away from the exposed optical surfaces. In other embodiments, the barrier structure use separation as an avoidance mechanism by optimizing the position of the exposed optical surfaces relative to the opening of the mouse cavity through which light passes. One or more embodiments of these barrier structures can be used in combination in a single mouse.

Other embodiments of the invention are directed to detecting contaminants in a coherent illumination mouse using various combinations of light sources, imaging surfaces, and detection algorithms. In some embodiments, only one type of light source (e.g. coherent) is present while in other embodiments, two types of light sources (e.g., both coherent and non-coherent) are used to detect the contaminants. Imaging surfaces comprise any one of a navigation surface, a known imaging surface, or a reflective surface, such as a first surface mirror. These light sources and imaging surfaces are used to generate one or more images for analysis to identify interference patterns in the images which indicate the likely presence of a contaminant. A user is notified when the interference patterns exceed a threshold value.

In other embodiments, a cradle or service station is configured to removably receive a mouse and apply a cleaning mechanism to remove contaminants from exposed optical surfaces of the mouse and/or surfaces of the mouse adjacent to the exposed optical surfaces. These cleaning mechanisms include a force applicator comprising a static or active brush that mechanically removes the contaminants from the exposed optical surfaces, or a pressurized gas mechanism for blowing the contaminants off of the exposed optical surfaces.

Embodiments of the present invention can use one or more of any of the compensation mechanisms, such as barrier structures, detection mechanisms, and cleaning mechanisms, in combination with each other to increase the likelihood of neutralizing the effect of contaminants on coherently-illuminated optical mice.

FIG. 1 illustrates one embodiment of a system 20 comprising optical mouse 22, pad 24 with navigation surface 25, and cradle 26. Mouse 22 comprises body 30, which houses optics module 32 and neutralizing element 34, and which also defines bottom 36. Optics module 32 comprises a combination of a coherent light source, an illumination lens, an imaging lens, and an image sensor, as will be further described and illustrated in association with FIG. 2.

Optical mouse 22 is used as a pointing device for a computer (not shown) based upon sliding movement between bottom surface 36 of optical mouse 22 relative to navigation surface 25. In particular, optics module 32 obtains a series of images of navigation surface 25 over time as the mouse 22 moves relative to navigation surface 25. The differences between the images obtained over time is converted into movement information for directing movement of a pointer on a graphical user interface of a computer or other device.

Cradle 26 comprises receiving well 40, neutralizing element 42, and electrical contact pads 44. Receiving well 40 of cradle 26 is shaped and sized for receiving a mouse to hold a mouse for storage, or recharging (e.g. when mouse 20 houses rechargeable batteries). Electrical contact pads 44 are positioned for electrically conductive contact with reciprocating contact pads on mouse 22 (not shown) for recharging mouse 22 or other purposes. Cradle 26 comprises any one of a charging station for a cordless, rechargeable mouse, a docking station, a storage cradle, a mouse cleaning station, or a mouse service station, and may be used with either a cordless or corded mouse.

Neutralizing element 34 of mouse 22 embodies a mechanism to compensate for contaminants 50 that affect optics module 32 of mouse 22 and comprises one of the previously identified barrier structures or detection mechanisms. Neutralizing element 42 of cradle 26 embodies a mechanism to compensate for contaminants 50 that affect optics module 32 of mouse 22, and comprises one of the previously identified cleaning mechanisms or a portion of one of the detection mechanisms. Accordingly, embodiments of the invention for compensating for contaminants 50 can be implemented as neutralizing elements 34, 42, respectively, in just one of mouse 22 or cradle 26, or both mouse 22 and cradle 26, and are described in detail in the embodiments of FIGS. 2-16.

FIG. 2 is a sectional view of an optical mouse 60, according to one embodiment of the invention. As shown in FIG. 2, mouse 60 comprises shell 62, which defines cavity 63, top 64, and bottom 66 with opening 68. Mouse 60 also comprises optics module 80, which includes coherent light source 82, sensor 84, illumination lens 86 with surface 87, and imaging lens 88 with surface 89. Lens surface 87, lens surface 89, and surface 90 are all exposed to the environment via opening 68 in bottom 66 of mouse 60. In another embodiment, opening 68 is formed on a different surface (e.g. top, side) of shell 62 with optics module 80 arranged to emit and receive light through opening 68 in association with navigation surface 25 or an alternative navigation surface that is alignable with opening 68 for optical navigation.

Coherent light source 82 produces at least partially coherent light. In one embodiment, coherent light source 82 comprises a laser light source and produces substantially coherent light in which the coherence length allows interference patterns that are discernable by a sensor, such as sensor 84. Sensor 84 comprises an integrated circuit including one or more of digital input/output circuitry, processing circuitry, analog/digital signal conversion, light source drivers, and a photodetector array. Illumination lens 86 directs coherent light from light source 82 in a focused pattern onto navigation surface 25 while imaging lens 88 receives and directs a pattern of light reflected from navigation surface 25 into sensor 84.

Optics module 80 also comprises controller 85 which has logic for controlling the operation of light source 82 and sensor 84, a memory for storing images obtained at sensor 84, and logic for communicating movement information from optics module 80 to an external device, such as a computer, for directing a pointer on a graphical user interface. In some embodiments, controller 85 is incorporated into sensor 84.

In one embodiment, each surface 87 of illumination lens 86 and surface 89 of imaging lens 88 comprises a transparent contaminant-repelling coating 94, 95 respectively, that is made of an anti-static material, conductive material or other substance that repels contaminants. Directional arrows in FIG. 2 indicate the repulsion of contaminants 50 away from these surfaces.

In some embodiments, optics module 80 comprises transparent surface 90 that seals optics module 80 apart from opening 68 of mouse 60 and the surrounding environment. In one embodiment, transparent surface 90 is joined to surfaces 87, 89 of lenses 86, 88 into an integrated or monolithic structure. Surface 90 prevents contaminants 50 from penetrating into cavity 63 beyond surface 90. To further increase the effectiveness of surface 90 at neutralizing the effect of contaminants, in some embodiments surface 90 also comprises a transparent coating 96 of anti-static material, conductive material, or other contaminant-repelling material. In some embodiments, coating 96 covers substantially all of surface 90. In other embodiments, coating 96 covers only a portion of surface 90. In addition, in other embodiments, coatings 94, 95, and 96 are formed as one single coating over one or more exposed optical surfaces of optics module 80.

Coatings 94, 95, and 96 act as a barrier structure that increase the performance of coherent light optical navigation by minimizing or preventing the adherence of contaminants onto exposed optical surfaces, such as surfaces 87, 89 of lenses 86, 88, respectively, and surface 90.

FIG. 3 is a sectional view of optical mouse 100, according to another embodiment of the invention. As shown in FIG. 3, mouse 100 comprises shell 62 and optics module 80, which have substantially the same features and attributes as corresponding elements of mouse 60 in the embodiment of FIG. 2. However, mouse 100 further comprises an optimized position of lenses 86 and 88 of optics module 80 within cavity 63 of mouse 100 to neutralize the effect of contaminants on images of navigation surface 25 produced via optics module 80. Lens 86 is positioned a fixed distance (D1) apart from opening 68 of mouse 100, and lens 88 is positioned a fixed distance (D2) apart from opening of mouse 100. Accordingly, this optimized lens position corresponds to a relatively fixed distance between lens surface 87 and navigation surface 25, and between lens surface 89 and navigation surface 25. Since diffraction patterns evolve after being created due to contaminants, then substantially maximizing the distance (while accounting for other constraints of the optical design) between an exposed exterior surface 87 of lens 86 and opening 68 of mouse 100 will likely minimize the effect of any interface pattern caused by a contaminant on surface 87 of lens 86. Similarly, substantially maximizing a distance (while accounting for other constraints of the optical design) between an exposed exterior surface 89 of lens 88 and sensor 84 (i.e., minimizing the distance between surface 89 of lens 88 and opening 68 of mouse 100) will likely minimize the effect of any interference pattern caused by a contaminant on surface 89 of lens 88. This increased separation distance between surface 89 and sensor 84 will allow an interference pattern associated with the contaminants to evolve sufficiently before reaching sensor 84 that the effects of the interference pattern will be minimized. Accordingly, this structured separation acts as a barrier to contaminants that would otherwise affect coherently illuminated optical navigation.

FIG. 4 is a sectional view of optical mouse 120, according to one embodiment of the invention. As shown in FIG. 4, mouse 120 comprises shell 62 and optics module 80 having substantially the same features and attributes as the corresponding elements of mouse 60 in the embodiment of FIG. 2, except omitting coatings 94, 95, 96. However, mouse 120 further comprises barrier structure 122 including outer walls 124 and inner walls 126. In one embodiment, walls 124, 126 extend substantially the whole length between opening 68 and lenses 86, 88, respectively. In other embodiments, one or more walls 124, 126 extend only a portion of the length between opening 68 of mouse 120 and lenses 86, 88.

Each wall 124, 126 of barrier structure 122 defines a boundary of a pathway between opening 68 and lenses 86, 88. Each wall 124, 126 comprises one or more attractants to attract and hold contaminants, thereby acting as a barrier to prevent contaminants from traveling to lenses 86, 88. In one embodiment, one or more of walls 124, 126 is made of a material configured for attracting and capturing contaminants. In another embodiment, one or more walls 124, 126 comprise a member having an adhesive surface 130 for attracting and holding contaminants. In another embodiment, one or more walls 124, 126 comprise a member on which an adhesive or tacky coating 132 is deposited for attracting and holding contaminants.

Finally, walls 124, 126 are not limited to the shape, lengths, or positions shown. Rather, walls 124, 126 can be arranged in any configuration along the optical path between opening 68 and the respective lenses 86, 88, in which an adhesive or attractant surface acts as barrier to prevent migration of contaminants onto surfaces 87, 89 of lenses 86, 88, respectively.

FIG. 5 is a sectional view of optical mouse 150, according to one embodiment of the invention. As shown in FIG. 5, mouse 150 comprises shell 62 and optics module 80 having substantially the same features and attributes as the corresponding elements of mouse 60 in the embodiment of FIG. 2, except omitting coatings 94, 95, 96. As shown in FIG. 5, mouse 150 further comprises contact pads 154 and transparent contaminant barrier 156. Contact pads 154 are disposed on bottom 66 of mouse 150 for maintaining sliding contact with navigation surface 25 and have a thickness that generally maintains opening 68 a small distance above navigation surface 25. Transparent barrier 156 is disposed within opening 68 to prevent the entry of contaminants into cavity 63 and onto surfaces 87, 89 of lenses 86, 88. Transparent barrier 156 comprises upper surface 158, lower surface 160, central portion 162 and wings 164 which extend from central portion 162. Wings 164 have a thickness generally equal to the thickness of contact pads 154 so that lower surface 160 of window 156 also is positioned for sliding contact with navigation surface 25. In another embodiment, transparent barrier 156 omits wings 164 and includes only central portion 162 that has a thickness (as shown) configured to make lower surface 160 substantially coplanar with a bottom surface of contact pads 154 for contact with navigation surface 25.

Transparent barrier 156 is made of a material that has upper and lower surfaces 158, 160 that are hard and optically smooth. In one embodiment, transparent barrier 156 is made of a sapphire material. This arrangement enables lower surface 160 to repel contaminants from lower surface 160 as mouse 150 travels over contaminants on navigation surface 25. In other words, lower surface 160 of transparent barrier 156 is configured to rub contaminants away from transparent barrier 156 to minimize the presence of contaminants below transparent barrier 156, thereby minimizing the effect of contaminants on optical navigation by mouse 150.

FIG. 6 is a partial sectional view of mouse 150 in which transparent barrier 156 has been replaced with transparent barrier 170 and omits contact pads 154, according to one embodiment of the invention. Transparent barrier 170 also defines an upper surface 171 and a lower surface 172 having hard, optically smooth surface. Transparent barrier 170 has a thickness generally corresponding to the thickness of bottom portion of shell 62 of mouse 150 so that its lower surface 172 is substantially coplanar with bottom 66 of mouse 150, and acts as a contact surface against navigation surface 25 to rub contaminants off lower surface 172. In another embodiment, transparent barrier 170 is accompanied by contact pads 154 (as shown in FIG. 5) on bottom 66 of mouse 150 so that lower surface 172 does not act as a contact surface against navigation surface 25.

FIG. 7 is a sectional view of optical mouse 180, according to one embodiment of the invention. As shown in FIG. 7, mouse 180 comprises shell 62 and optics module 80 having substantially the same features and attributes as corresponding elements of mouse 60 in the embodiment of FIG. 2, except omitting coatings 94, 95, 96. As shown in FIG. 7, mouse 150 further comprises transparent barrier 182 which prevents entry of contaminants into cavity 63 and onto components of optics module 80. Transparent barrier 182 extends across substantially the entire bottom 66 of mouse 180, thereby also taking the place of conventional contact pads (e.g. contact pads 154 in FIG. 5) that normally provide that sliding contact function.

Transparent barrier 182 is comprised of a material, such as sapphire, that has upper and lower surfaces 184, 186 that are hard and optically smooth. This arrangement enables lower surface 186 to repel contaminants from lower surface 160 as mouse 180 travels over contaminants on navigation surface 25. In other words, lower surface 186 of layer 182 is configured to rub off contaminants from layer 182 to minimize the presence of contaminants below layer 182, thereby minimizing the effect of contaminants on optical navigation. Finally, transparent barrier 182 also provides a physical boundary, preventing the penetration of contaminants into cavity 63 that houses optics module 80.

FIG. 8 is a sectional view of optical mouse 200 and a known imaging surface 202, according to one embodiment of the invention. As shown in FIG. 8, mouse 200 comprises shell 62 having substantially the same features and attributes as the corresponding elements of mouse 60 in the embodiment of FIG. 2, except omitting coatings 94, 95, 96. Mouse 200 further comprises optics module 210 including coherent light source 212 (e.g., light source A), non-coherent light source 214 (e.g., light source B), first illumination lens 216, second illumination lens 217, first sensor 220, second sensor 222, first imaging lens 226 and second imaging lens 228. Optics module 210 also comprises controller 240 which has logic for controlling the operation light sources 212, 214 and sensors 220, 222, a memory for storing images obtained at sensors 220, 222, and logic for operating a comparison module for evaluating differences between the images. In some embodiments, external controller 250 comprises a memory and logic for storing and operating a comparison module for evaluating differences between the images and communicates with controller 240 to perform that evaluation. External controller 250 is in wired or wireless electrical communication with controller 240.

Coherent light source 212 produces at least partially coherent light while non-coherent light source 214 comprises a light emitting diode (LED). In one embodiment, coherent light source 82 comprises a laser light source and produces substantially coherent light in which the coherence length allows interference patterns that are discernable by a sensor, such as sensor 84. Sensor 84 comprises an integrated circuit including one or more of digital input/output circuitry, processing circuitry, analog/digital signal conversion, light source drivers, and a photodetector array.

Optics module 210 provides two independent imaging pathways, one for coherent illumination and one for non-coherent illumination. A first, coherent illumination pathway is provided by coherent light source 212, first illumination lens 216, first imaging lens 226, and first sensor 220. A second, non-coherent illumination pathway is provided by non-coherent light source 214, second illumination lens 217, second imaging lens 228, and second sensor 222.

In one embodiment, these independent pathways enable simultaneously obtaining images for detection of contamination. In addition, providing independent optical pathways enables the attributes of lenses (e.g. position, thickness, curvature, material, etc.) to be optimized for each type of light source. In other embodiments, images from coherent illumination and images from non-coherent illumination are obtained one at a time in sequence, thereby permitting use of a single illumination lens for both light sources, a single imaging lens for both light sources, and a single sensor for both light sources. In other words, first illumination lens 216 and second illumination lens 217 are combined into a single lens and first imaging lens 226 and second imaging lens 228 are combined into a single imaging lens, and first sensor 220 and second sensor 222 are combined into a single sensor. Other embodiments using a combination of some of the elements 216, 217, 226, 228 are envisioned, such as an optics module 210 including first illumination lens 216 and a second illumination lens 217, a single imaging lens, and a single sensor.

Known imaging surface 202 comprises an imaging surface which has known topography and reflectance characteristics so that when non-coherent illumination is applied (via non-coherent light source) 214 to known imaging surface 202, contaminants will not produce detectable interference patterns in an image obtained via sensor 222 due to the diffuse nature or random phase of the non-coherent illumination. On the other hand, when coherent illumination is applied to this known imaging surface 202, contaminants produce recognizable interference patterns in images of known imaging surface 202 obtained via sensor 220 due to the focused nature of the coherent light. By comparing the differences in these obtained images of known imaging surface 202 for interference patterns, contaminants are detected. Various comparison modules are stored in controller 240 or external controller 250 for performing the comparison of the images of known imaging surface 202.

In one embodiment, controller 240 or external controller 250 stores in memory the expected characteristics of an image of navigation surface generated by a coherent light source and/or a non-coherent light source.

In one embodiment, known imaging surface 202 is incorporated into cradle 26 of FIG. 1 as neutralizing element 42 so that upon removable insertion of mouse 200 into cradle 26, known imaging surface 202 is aligned with optics module 210 of mouse 200, substantially as shown in FIG. 8.

In use, a first image of known imaging surface 202 is obtained via coherent illumination and a second image of known imaging surface 202 is obtained via non-coherent illumination. The two images are compared for interference patterns associated with contaminants. When a parameter (e.g., value for intensity or volume of interference in the images) of the interference pattern exceeds a threshold value, the user is notified that a contaminant has been detected on an exposed optical surface of optics module 210.

Figure 9:
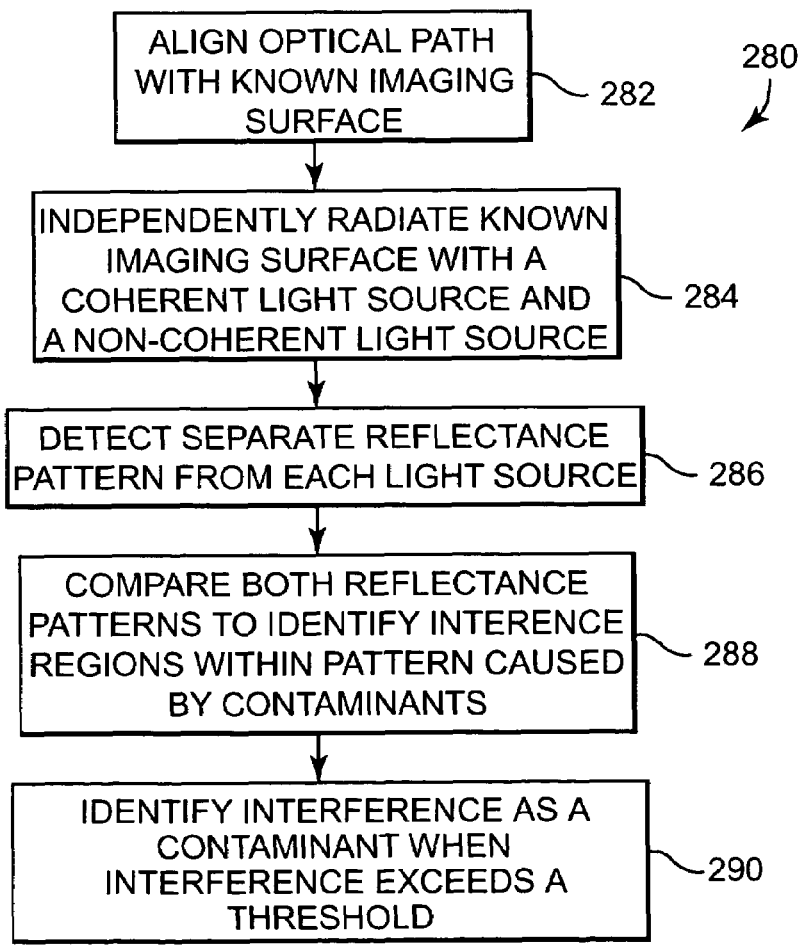
FIG. 9 is a flow diagram of a method of detecting contaminants, according to one embodiment of the present invention.

FIG. 9 is a flow diagram illustrating one embodiment of a method 280. Method 280 is performed using mouse 200 in the embodiment of FIG. 8, as well as other suitable optical navigation devices. At box 280, an optical path of a mouse is aligned with a known imaging surface. At box 284, the known imaging surface is independently radiated with a coherent light source and a non-coherent light source. The coherent light source produces at least partially coherent light or substantially coherent light. At box 286, sensors separately obtain images based on a reflectance pattern produced by each light source. At box 288, method 280 includes comparing both images to identify interference regions within images caused by contaminants. At box 290, a contaminant is identified when a parameter of the interference pattern exceeds a threshold value. This identification of the contaminant can be then be communicated to the user to clean the mouse for improved performance, or other corrective action can be taken in response to the identification.

Figure 10:
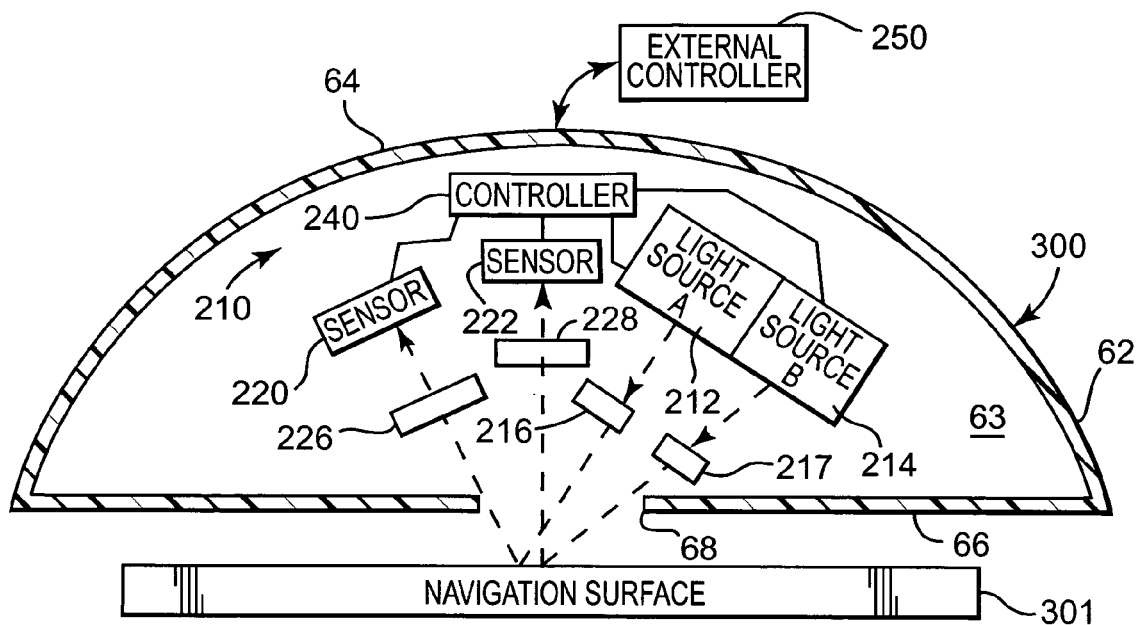
FIG. 10 is a schematic sectional view of an optical mouse and a navigation surface, according to one embodiment of the present invention.

FIG. 10 is a sectional view of optical mouse 300 and a navigation surface 301, according to one embodiment of the invention. As shown in FIG. 10, mouse 300 comprises shell 62 and optics module 210 having substantially the same features and attributes as corresponding elements of mouse 200 in the embodiment of FIG. 8. Navigation surface 301 comprises a common navigation surface over which mouse 300 would slide during normal use, such as a surface of a mouse pad, desktop, etc.

In use, images of navigation surface 301 are obtained periodically from both coherent illumination (via coherent light source 212) and non-coherent illumination (via non-coherent light source 214) over time. A comparison of a series of these images generated via different types of light sources enables recognition of interference patterns on the images that are associated with contaminants, since contaminants produce different effects in response to each type of illumination. A comparison module for performing this comparison is stored in controller 240 and/or in external controller 250. Interference patterns that have a parameter (e.g., an intensity or volume) that exceed a threshold value cause the interference to be identified as a contaminant so that a user can be notified that contaminants have been detected on one or more exposed optical surfaces of mouse 300, or so that other corrective action can be taken.

Figure 11:
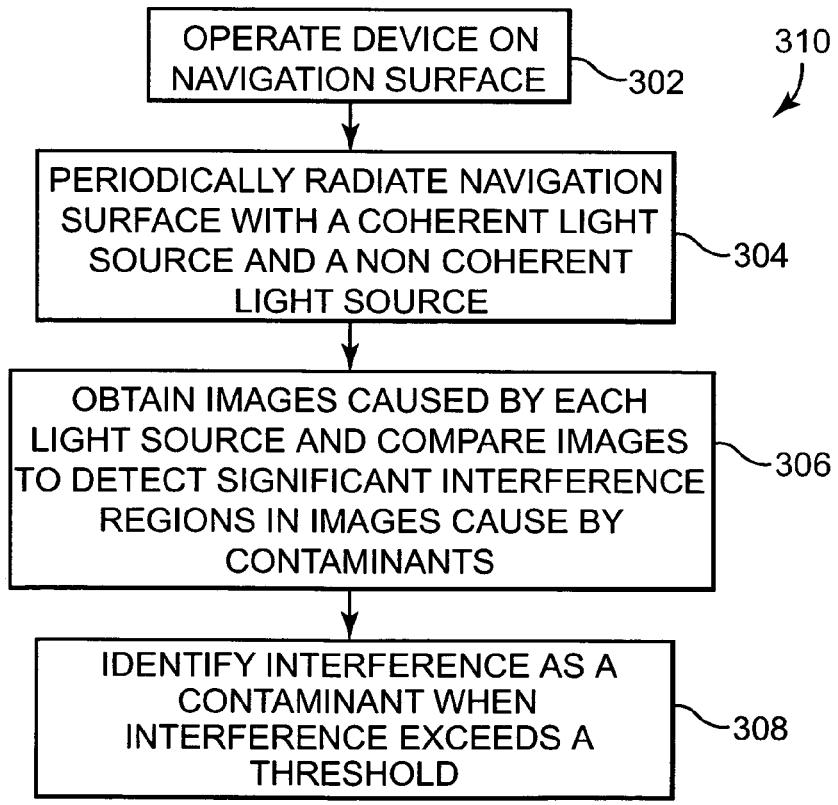
FIG. 11 is a flow diagram of a method of detecting contaminants, according to one embodiment of the present invention.

FIG. 11 is a flow diagram of one embodiment of a method 310 of detecting contaminants using optics module 210 of mouse 300 of FIG. 10, or other suitable optical navigation devices. At box 302, an optical mouse is operated on a navigation surface. At box 304, the navigation surface is periodically radiated from the optical mouse with illumination from a coherent light source and from a non-coherent light source. At box 306, periodic images are obtained, via one or more sensors, of the navigation surface from each type of illumination and these images from different types of illumination are compared over time via averaging to detect interference patterns in the images associated with contaminants. At box 308, interference is identified as a contaminant when a parameter (e.g., a quantity value or frequency of appearance) of the interference patterns exceeds a threshold value. This identification then can be communicated to the user, or other corrective action can be taken.

FIG. 12 is a sectional view of one embodiment of a system 350 comprising optical mouse 352 and cradle 354. As shown in FIG. 12, mouse 352 comprises shell 62 and optics module 80 having substantially the same features and attributes as corresponding elements of mouse 60 in the embodiment of FIG. 2, except omitting coatings 94, 95, 96. Cradle 354 comprises base 370, receiving well 372, support surface 374, and reflecting element 376 with reflective surface 378.

In one embodiment, reflecting element 376 comprises a first surface mirror in which reflective surface 378 defines the first surface of the mirror which reflects light without the light passing through any glass component of the mirror. This arrangement substantially reflects the light while producing minimal scattering, absorption, refraction, etc. In other embodiments, reflecting element 376 comprises other reflecting materials in which reflective surface 378 provides a substantially reflective pattern with minimal scattering, absorption, or refraction of light in response to coherent illumination from a light source, such as coherent light source 82 of optics module 80.

In response to coherent illumination, this type of reflective surface 378 generates an image, obtained via sensor 84, in which a parameter (e.g., intensity and/or volume) of the interference patterns associated with contaminants, are easily detected when compared to the expected reflectance pattern from reflective surface 378 without contaminants.

Optics module 80 also comprises controller 85, which has substantially the same attributes and features as controller 85 of mouse 60 of the embodiment of FIG. 2, and which additionally stores and operates an evaluation module for evaluating images generated from reflecting element 376 to detect contamination. Upon detection of a contaminant, controller 85 initiates notification to a user that cleaning of optics module 80 is recommended. In some embodiments, external controller 362 stores a comparison module for evaluating images obtained from reflective surface 378 and performs the evaluation independently of controller 85 or in cooperation with controller 240. External controller 362 is in wired or wireless electrical communication with controller 85.

Reflecting element 376 with reflective surface 378 corresponds to neutralizing element 42 of cradle 26 of FIG. 2 whereby reflective surface 378 is used in cooperation with optics module 80 to detect contaminants on exposed surface of optics module 80.

FIG. 13 is a flow diagram of one embodiment of a method 400 of detecting contaminants for an optical mouse. Method 400 is performed using reflective surface 378 of cradle 354 in the embodiment of FIG. 12, or other suitable reflective surfaces. As box 402, an optical path generated by an optics module of a mouse is aligned with a reflective surface of a cradle. At box 404, a reflective surface is optically radiated with coherent light. At box 406, the coherent light is reflected, via the reflective surface, with minimal scattering. At box 408, contaminants are detected on a surface or portion of optics module 80 based on the intensity or size of an interference region on the obtained image of the reflective surface of the cradle. At box 410, interference is identified as a contaminant when a parameter of the interference region exceeds a threshold value. Once a contaminant is identified, the user can be notified or other corrective action can be taken.

FIG. 14 is a sectional view of one embodiment of a system 450 of optical mouse 452 and cradle 454 directed to cleaning contaminants from optical mouse 452. As shown in FIG. 14, optical mouse 452 comprises a bottom surface 460 and optics module 462. In one embodiment, optics module 462 has substantially the same attributes and features as optics module 80 of embodiment of FIG. 2, except omitting coatings 94-96. In other embodiments, optics module 462 of mouse 452 has one or more features of optical mice described in association with embodiments of FIGS. 2-8, 10, 12.

Cradle 454 comprises substantially the same features and attributes of cradle 354 of embodiment of FIG. 12, except omitting reflective element 376 and additionally including cleaning element 468 with particulate remover 470 suitable for cleaning an optical surface.

In use, mouse 452 is slidably advanced into receiver 372 of cradle 454 so that optics module 462 exposed on bottom 460 of mouse 452 passes by particulate remover 470 of cleaning element 468, thereby removing contaminants from one or more surfaces of optics module 462. This relative movement between particulate remover 470 and optics module 462 produces a wiping or sweeping action that rubs off the contaminants from the exposed optical surfaces of optics module 462. In this embodiment, particulate remover 470 is fixed to support surface 374 in a static position, thereby providing a passive cleaning mechanism. In one embodiment, particulate remover 470 comprises a brush while in other embodiments, particulate remover 470 comprises a pad or other non-abrasive surface.

FIG. 15 is a sectional view of one embodiment of a system 500 of optical mouse 452 and cradle 502 directed to cleaning contaminants from optical mouse 452. As shown in FIG. 15, optical mouse 452 and cradle 502 comprises substantially the same features and attributes as optical mouse 452 and cradle 454 of embodiment of FIG. 14, except that cradle 502 additionally comprises recess 510 and cleaning mechanism 520 instead of cleaning element 468. As shown in FIG. 15, cleaning mechanism 520 includes moveable particulate remover 522, linkage 524, actuator 526, mechanical trigger 530 and electrical trigger 532. Particulate remover 522 includes a non-abrasive surface suitable for cleaning an optical surface and comprises a cylindrical brush, cylindrical pad, or other surfaced element suitable for cleaning optical surfaces. Mechanical trigger 530 comprises a depressible protrusion or lever that is depressed by mechanical contact with bottom 460 of mouse 452 as mouse 452 is slid into or placed in cradle 502. In one embodiment, electrical trigger 532 comprises an electrically conductive contact pad in which electrical communication is established with conductive contact pad 464 on bottom 460 of mouse 452 as mouse 452 is slid into or placed in cradle 502. In another embodiment, electrical trigger 532 comprises a non-contact sensor which detects the presence of the bottom 460 of mouse 452 via reflection or other mechanisms.

Upon activation from either mechanical trigger 530 or electrical trigger 532 that mouse 452 is present in cradle 502, actuator 526 directs movement of moveable particulate remover 522 against optics module 462 for cleaning. In the embodiment in which particulate remover 522 is a brush, brush 522 is rotated by actuator 526 via linkage 524. Brush 522 is rotated continuously, or for a discrete number of full or partial revolutions (e.g. a wiping or sweeping action) to pass the surface of brush 522 against exposed optical surfaces of optics module 462 of mouse 452, thereby removing any contaminants from those exposed optical surfaces. In other embodiments, brush 522 is driven by actuator 526 via linkage 524 to move in non-rotational manner, such as cycles of intermittent pressing contact or other non-rotational contact. Accordingly, cradle 502 provides an active cleaning mechanism for removing contaminants from surfaces of coherent light optic components, thereby neutralizing the effect of the contaminants.

FIG. 16 is a sectional view of one embodiment of a system 550 of optical mouse 452 and cradle 552 for cleaning contaminants from optical mouse 452. As shown in FIG. 16, optical mouse 452 and cradle 552 comprise substantially the same features and attributes as optical mouse 452 and cradle 454 of embodiment of FIG. 14, except that cradle 552 additionally comprises port 560 and cleaning mechanism 570 instead of cleaning element 468. As shown in FIG. 16, cleaning mechanism 570 emits a short burst of pressurized gas 561 (e.g., air or another suitable gas) onto optics module 462 of mouse 452. Cleaning mechanism 570 comprises one of four gas sources which are housed within cradle 552. These four gas sources comprise internal compressor 571, removable/refillable container 572, thermal gas burst generator 574, or an external gas source 580. External gas source 580 is connected via external source connector 582, which enables fluid communication of a gas between external gas source 580 and port 560 via control valve 584. In one embodiment, thermal gas burst generator 574 comprises a fluid ejection device, such as thermal drop-on demand ink jet printhead known to those skilled in the art. Cleaning mechanism 570 also comprises actuator 576, electrical trigger 578, and mechanical trigger 579 which have substantially the same features and attributes as corresponding actuator 526, and triggers 530, 532 as described for FIG. 15.

In use, mouse 452 is placed into cradle 552 with bottom surface 460 against support surface 374 of cradle 552, causing electrical contact between contact pad 464 of mouse 452 and electrical trigger 578 of cradle 552, or causing electrical trigger 578 to detect the presence of bottom 460 of mouse 452 via reflective or other non-contact means, or actuating mechanical trigger 579 by mechanical contact with bottom 460 of mouse 452. Upon any one of these triggers, a cleaning cycle is initiated by cleaning mechanism 570. Upon this triggering, actuator 576 commands a gas source (any one of internal compressor 571, removable/refillable container 572, thermal gas burst generator 574, or external gas source via connector 582) to direct a short burst of gas (e.g., air or other suitable gas) through port 560 and onto optics module 462, thereby removing contaminants from one or more surfaces of optics module 462. Accordingly, cleaning mechanism 570 provides an active cleaning mechanism for neutralizing the presence of contaminants in the environment of coherently-illuminated pointing devices.

Embodiments of the present invention provide detection and cleaning of contaminants from exposed optical surfaces of coherently-illuminated optical pointing devices, as well as preventing contaminants from reaching those exposed optical surfaces. With these anti-contamination measures, the performance advantage of coherently-illuminated optical navigation for hand-operated pointing devices are better realized.

Although specific embodiments have been illustrated and described herein for purposes of description of the preferred embodiment, it will be appreciated by those of ordinary skill in the art that a wide variety of alternate and/or equivalent implementations may be substituted for the specific embodiments illustrated and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of detecting contaminants with an optical mouse, the method comprising:
    aligning an optics module of a mouse with an imaging surface;
    obtaining a first image of the imaging surface, via application of substantially coherent illumination from the optics module to the imaging surface;
    analyzing the first image to identify an interference pattern associated with a contaminant; and
    identifying the interference pattern as a contaminant if a parameter of the interference pattern exceeds a threshold value.

2. The method of claim 1 wherein aligning an optics module comprises:
    positioning the imaging surface on a cradle configured to removably receive the mouse; and
    implementing the imaging surface as a substantially reflective surface.

3. The method of claim 1 and further comprising:
    obtaining a second image of the imaging surface, via application of non-coherent illumination from the optical module to the imaging surface;
    wherein analyzing the first image comprises comparing the first image to the second image for differences between the first image and the second image to identify the interference pattern.

4. The method of claim 3 wherein aligning the optics module of the mouse comprises:
    positioning the imaging surface on a cradle as a known imaging surface; and
    removably inserting the mouse into the cradle to align the at least one exposed surface of the optics module with the known imaging surface.

5. The method of claim 3 wherein aligning the optics module with an imaging surface comprises operating the mouse over a navigation surface;
    wherein obtaining the first image comprises periodically obtaining a series of first images of the navigation surface, via application of substantially coherent illumination from the optical module to the navigation surface;
    wherein obtaining a second image comprises periodically obtaining a series of second images of the navigation imaging surface, via application of non-coherent illumination from the optical module to the navigation surface;
    wherein analyzing the first image comprises comparing the series of first images to the series of second images for differences to identify the interference pattern.

* * * * *